United States Patent

[11] 3,600,579

[72] Inventors Serge Carpentier, Creteil; Radovan Dajlevic, Rontenay-aux-Roses; Roger Delarue, Paris; Henri Francois, Paris; Guy Portal, Massy; Jacques Pradel, Malakoff; Georges Soudain, Antony, all of, France
[21] Appl. No. 789,460
[22] Filed Jan. 7, 1969
[45] Patented Aug. 17, 1971
[73] Assignee Commissariat A L'Energie Atomique Paris, France
[32] Priority Jan. 18, 1968, Sept. 18, 1968, Mar. 12, 1968
[33] France
[31] 136,564, 166,636 and 143,427

[54] THERMAL LUMINESCENT MATERIAL FOR IONIZING RADIATION DOSIMETRY
10 Claims, 6 Drawing Figs.
[52] U.S. Cl. .................................................. 250/71, 250/83
[51] Int. Cl. ...................................................... G01t 1/11

[50] Field of Search ........................................... 250/83 CD, 71, 83

[56] References Cited
UNITED STATES PATENTS
| | | | |
|---|---|---|---|
| 2,616,051 | 10/1953 | Daniels........................ | 250/71 |
| 3,337,948 | 8/1967 | Schulman..................... | 250/71 |
| 3,471,699 | 10/1969 | McCall......................... | 250/83 |
| 3,484,605 | 12/1969 | Attix ............................ | 250/71 |

OTHER REFERENCES
Goldberg, Luminescence Of Inorganic Solids, pages 225, 226, 259, 287 to 292, 309—310, 318— 320, 448 to 451. Academic Press Inc., 1966

Primary Examiner—Archie R. Borchelt
Attorney—Cameron, Kerkam and Sutton

ABSTRACT: The material essentially consists of alumina $Al_2O_3$ in the form of particles smaller in size than 400 $\mu$. A proportion higher than 80 percent by weight should be in the form of alpha crystals. A proportion of particles at least equal to 60 percent has a size higher than 10 $\mu$. The alumina may be used in powdered form or included in a construction material.

PATENTED AUG 17 1971

INVENTOR

BY

ATTORNEY

PATENTED AUG 17 1971 3,600,579

INVENTOR

BY

ATTORNEY

THERMAL LUMINESCENT MATERIAL FOR IONIZING RADIATION DOSIMETRY

This invention is directed to a thermoluminescent material for the determination of absorbed dosages of ionizing radiation.

Radiothermoluminescence is a phenomenon which is exhibited by many materials and consists in the emission of luminous radiation when the material which has previously been irradiated is heated to a sufficiently high temperature. Thermoluminescence is due in particular to excitation of electrons which are caused to undergo a transition and brought into "traps" in which they are in a metastable state. When the material is heated, these electrons return to the unexcited state and emit luminous radiation.

A large number of different materials have already been employed as ionizing radiation dosimeters. In particular, lithium fluoride and calcium fluoride doped with small proportions of impurities such as magnesium or manganese have been employed in particular by reason of their high sensitivity. However, the materials which have been employed in practice up to the present time especially as dosimeters for the periodic measurement of absorbed radiation dosages received by individuals are attended by disadvantages and in particular the disadvantage of being extremely costly. In consequence, it is not economically feasible to employ these materials as constituents of the safety dosimeters which are provided in large numbers within areas which are liable to be exposed to ionizing radiation in the event of an accident condition and which are intended to be "read" solely in such an event. There is thus no simple means available for making a graphic record of absorbed radiation dosage which would frequently prove highly useful.

The objective of this invention is to provide a thermoluminescent dosimetric material which meets practical requirements more effectively than any comparable material proposed heretofore (especially in the field of accident dosimetry). The fulfilment of this objective entails the need for a material which has suitable properties for the detection of high doses, which is extremely inexpensive to produce and which is practically insensitive to weathering agents as well as to the majority of corrosive agents.

To this end, the invention proposes a thermoluminescent material for measuring absorbed dosages of ionizing radiation and essentially made up of alumina $Al_2O_3$ in the form of grains smaller in size than 400 $\mu$, a proportion higher than 80 percent by weight of said alumina being in the form of $\alpha$ crystals.

Consideration has already been given to the use of alumina as a thermoluminescent material but the results obtained have proved disappointing since alumina materials tested up to the present time have failed to exhibit the essential properties referred-to in the foregoing. In particular, it is necessary to ensure that the grains are presented in the form of transparent crystalline fragments whereas the majority of commercially available products are provided in the form of crystals which are much smaller (of the order of 1 micron). These crystals tend to agglomerate into nontranslucent granules which have a lower capacity for thermoluminescence emission, even assuming that such thermoluminescence exists.

The thermoluminescent material can be employed in a wide variety of forms: powder, fabricated part in which the alumina is dispersed and the cohesion of which is ensured by means of a binder.

The electron traps which give rise to radiothermoluminescence can be created by the presence of sodium in the alumina. The sensitivity of the material increases with the sodium content in approximately linear manner, that is to say up to a maximum value of the order of 1 percent in $\alpha$-alumina. There is therefore no practical advantage to be gained by exceeding this proportion, especially in consideration of the fact that sodium aluminate is produced above this value. A proportion between 100±p.p.m. and 1 percent by weight is accordingly adopted.

In order that the alumina should be in the $\alpha$-phase, a mineralizer must be added thereto. For this purpose, it is possible in particular to make use of fluorine which, at the time of preparation of alumina by melting followed by solidification, leads to the formation of single crystals of large size. When carrying out the subsequent grinding of these crystals, there are thus obtained grains which are essentially made up of translucent fragments of single crystals of $\alpha$-alumina (namely corundum). If fluorine were not present, the alumina would have a high proportion of $\beta$ phase, the grains would be similar to those of alumina which is prepared by calcining, would be relatively opaque, and any light emitted by thermoluminescence would be absorbed in the grains, thereby making the material unsuitable for dosimetry.

The upper limit of 400 microns for the size of the grains is a practical limit; above this size, it is in fact a matter of difficulty to heat the grains right through in a uniform manner for reading purposes. Conversely, it is desirable to ensure that the material should contain a proportion of at least 60 percent by weight of grains having a size larger than 10 microns: below this size, the light emitted at the time of heating does not readily pass out of the grains in order to impress the light-sensitive element of the reader.

In the case of some elements such as manganese and chromium, the proportions which are present in the alumina must be as low as possible and preferably smaller than 20 p.p.m. : even in small amounts, these elements have an unfavorable incidence on the thermoluminescence of the material.

By way of example, a thermoluminescent material which is suitable for dosimetry has been prepared by a fusion casting process. This material consisted of approximately 95 percent by weight of $\alpha$-phase, the proportion of useful impurity (sodium) being 0.7 percent by weight; the material also contains traces of $SiO_2$, $Fe_2O_3$, Ti, V, Ge and F.

Under the microscope, the material appears to be made up of transparent crystalline fragments having well-defined edges.

After exposure to radiation, the thermoluminescent material as thus formed exhibits a radiothermoluminescence curve with four successive peaks when the temperature rises. The first three peaks appear to be due to the crystal lattice; the fourth peak (liberated at a higher temperature) is essentially due to traps created by the presence of the sodium. Only the last peak mentioned is stable and utilizable for dosimetry, subject to special precautions being taken. The three other peaks can be eliminated simply by heating to 150° C. for approximately 10 minutes.

The response of the thermoluminescent material according to the invention to the various types of radiation can be summarized as follows:

a. the curve of response to X-ray and gamma-ray photons is an intermediate curve between that of lithium fluoride and calcium fluoride. In the same manner as calcium fluoride but to a lesser extent, the material exhibits hypersensitivity at low energy levels: the response to radiations of 45 Kev. energy is approximately three times greater than the response obtained with radiation of 1 Mev. energy. Above this level and up to approximately 10 Mev., the sensitivity is practically constant.

b. The response to fast neutrons is negligible in the case of an energy level which is lower than 8 Mev. At an energy level which is higher than 8 Mev., the production of $Na_{24}$ results in a not-negligible response. However, it must be borne in mind that the proportion of neutrons having an energy which is higher than 8 Mev. is low in neutron fluxes which result from acts of fission so that it may in fact be considered that the material has only negligible sensitivity to fast neutrons.

c. The response to thermal neutrons is of the same order as the response to gamma radiations. More specifically, the response of the material to 1 Rem of thermal neutrons is equivalent to that which results from an apparent gamma-radiation dose of 0.75 Rem. This feature represents an advantage over other materials such as LiF which are hypersensitive to thermal neutrons.

d. Sensitivity to $\beta$–radiation can be utilized in the case of high energies above approximately 1 Mev. By reason of the low penetration of $\beta$–radiation, it is preferable in order to measure the absorbed dose to employ a material which has a very small particle size. In this case, the response is equivalent to that which is obtained with gamma radiation.

One of the most advantageous methods of practical utilization of the thermoluminescent material according to the invention appears to consist in incorporating the material in building products (such as bricks, tiles, slabs and the like) which can be employed in conjunction with conventional products used for erecting or covering walls of buildings and which also serve to determine dosages of ionizing radiation (such as gamma and neutron radiation) which are absorbed by the wall.

A problem may arise in regard to the need to determine either periodically or as a result of a particular accident condition the radiation dose which is received directly at a given location or the radiation dose resulting from the radioactive contamination of said location. Apart from causes of nuclear explosion, this determination can be carried out in proximity to a research reactor or power reactor in order to check the absence of ionizing radiation at periodic intervals and can be useful in the event of a reactor accident. The positioning of conventional dosimeters does not constitute a satisfactory solution. In point of fact, it is difficult to deduce the contamination received by an entire wall from the dose which is recorded by a dosimeter of the thermoluminescent type, for example, which is placed in the immediate vicinity. The addition of a conventional dosimeter to the wall of a completed building often makes it necessary to subject the dosimeter to many causes of destruction.

This problem is solved by the invention which proposes to distribute the alumina grains in an homogeneous manner within a part in which cohesion is ensured by means of a chemical, organic, ceramic or hydraulic binder.

When the part is intended to be employed as building material, it is required to satisfy a certain number of criteria:

the part which is ready for use must be produced in the form of a brick, tile and the like which has either normal dimensions or small dimensions, which lends itself readily to the extraction of cylindrical sample cores, and which is homogeneous right through in order that the core should be identical irrespective of the location in which the sample is taken;

it must be possible to utilize the extracted core either directly or after a simple grinding operation without any preliminary sorting of fragments;

the proportion of alumina must be such as to ensure sufficient sensitivity. It can be considered that this condition is satisfied if a detectable response is obtained above 5 Rads.

The properties of the alumina according to the invention make it possible to satisfy a further condition: the law of variation which relates the absorbed radiation dose to the emission of light supplied to a reader must be known up to about $10^5$ Rads at a minumum and must be linear at least in the case of small doses.

All these conditions make it necessary in practice to adopt a weight percentage of $Al_2O_3$ contained in the material which is comprised between 70 percent and 98 percent and is preferably of the order of 95 percent.

The binder is intended to endow the part with mechanical properties which permit its use for building purposes (mechanical cohesion, lack of brittleness, resistance to natural weathering agencies and sufficient compressive strength). This criteria sets a practical limit on the alumina content. Among the binders which can be employed, the following deserve special mention:

the chemical binders such as the epoxy resins, the glasses, MgOCl, AlPO$_4$, and so forth;

the hot-state organic binders such as silicones;

the ceramic binders such as kaolin, feldspar, and so forth;

the hydraulic binders and especially the cements.

The method of fabrication of the part is obviously dependent in the first place on the nature of the binder employed once the mixture of $Al_2O_3$ and binder has been prepared and made as homogeneous as possible. If a hot-state organic binder is employed, said binder will be burnt after mixing with $Al_2O_3$ and shaped in the form of a brick. The products of the calcining process (carried out at 500° C. in the case of the silicones) have the effect of bonding the alumina grains together (by liberating silica which, in the presence of a basic element introduced in a small proportion in the mixture, produces a silicate. This bonding action endows the material with mechanical cohesion and crushing strength. In the case of a ceramic binder, the part will be prepared by firing the mixture of crystallized alumina in powder form and binder (kaolin and/or feldspar, for example) to which is added a small proportion of the order of 1 percent of a cold-state organic binder such as dextrin, molasses or paper pulp in order to ensure cohesion after pressing and 0.1 percent of wetting agent in order to reduce the surface tension. It should be borne in mind that the firing temperature will be the result of a compromise inasmuch as the cohesion of the grains of the aggregate is insufficient if the firing temperature is too low and the thermoluminescence phenomenon is inhibited if the temperature is too high. As a rule, firing will be carried out at a temperature within the range of 1000° C. to 1500° C.

Parts have been prepared in particular by means of the following process: the crystallized alumina is ground to a particle size which is smaller than 200 $\mu$, then mixed with a slip which forms the binder and is made up of kaolin and colloidal feldspar in water to which a wetting agent has been added. The respective proportions by weight were 96 percent in the case of the alumina, 3 percent in the case of the feldspar and 1 percent in the case of the kaolin in the finished brick, in which the quantity of water is not taken into account. A proportion of 1 percent of dextrin is added to the mixture prior to firing and eliminated during firing. The paste obtained is pressed into a brick-mold and dried. The crude brick which is delivered from the press is baked in two stages at temperatures of 1240° C. and 1450° C. This method of preparation is relatively common and is described in the book entitled "La technologie des produits ceramiques refractaires" by A. Jourdain (Gauthier Villars - Paris 1966).

The brick thus produced can be used with bricks of similar or different size for the purpose of building walls, partitions or floors. In order that the integral absorbed dose received by the wall or floor may be subsequently determined, a cylindrical sample core is extracted from the brick by means of a diamond drill if the brick is solid. One or a number of discs is cut from the core and placed in a reading instrument for a thermoluminescent dosimeter, said instrument having previously been calibrated with samples of material of the same type which have been subjected to known radiation doses. The indication recorded by the reader is plotted on a calibration curve which provides a visual measurement of the absorbed dosage.

Different parts according to the invention will now be described by way of nonlimitative example, reference being made to the accompanying drawings, in which.

Figure 1:
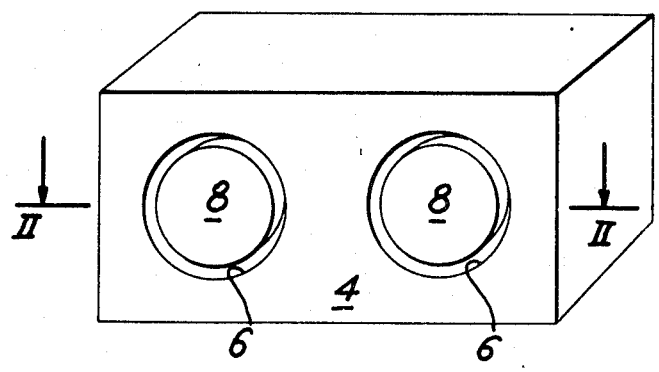
FIGS. 1 and 2 illustrate a brick which is so designed as to permit of ready extraction of sample cores, the views shown in these FIGS. being taken respectively in perspective and in cross section along the line II–II of FIG. 1.
Figure 2:
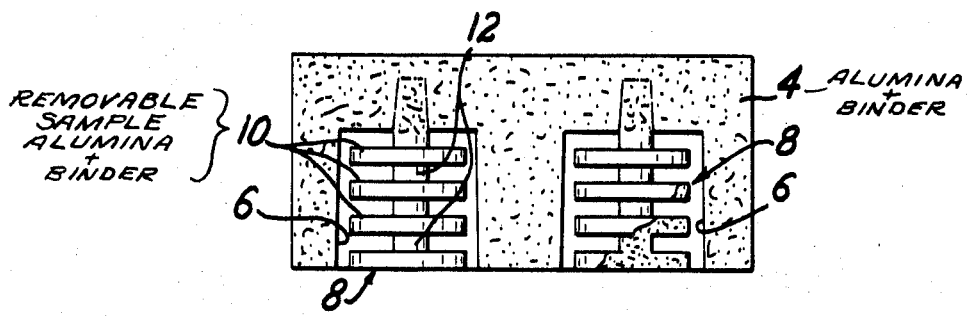

The brick which is illustrated in FIGS. 1 and 2 is made up of a solid portion 4 in which are formed recesses 6 of cylindrical shape. Provision is made within said recesses 6 for elongated projections 8 which are formed in one piece with the brick after firing and appear in the form of a stack of disc 10 having a diameter and thickness such that said discs can be placed within a reader (in some cases after grinding) and joined to each other by means of appendages 12. In order to extract a core sample, it is only necessary to break off one of the projections 8 and to separate the discs 10 from each other. One of the advantages provided by this structural arrangement of the bricks lies in the fact that the absorbed radiation doses can be determined at various depths and that indications relating to the energy of absorbed radiation may be deduced therefrom.

The fabrication of the brick can be carried out as follows: in a first step, the solid portion is pressed in such manner that a hole of suitable diameter (as shown in chain-dotted lines in FIG. 2) is formed at the base of each recess 6. A rod or slug of the same constituent material is prepared separately and circular grooves which are intended to separate the discs are formed in said slug. The projections thus formed are inserted in their recess-holes and the crude brick is than fired as indicated earlier, the object of this operation being to bond the solid portion 4 to the projecting portions 8.

When the brick which is illustrated in FIGS. 1 and 2 is to be exposed to natural weathering agencies, to contaminating agents, corrosive agents and radioactive dust particles, one objection to the brick is that it is subject to contamination either at the surface or within its recesses.

In order to remove this hazard, it is only necessary to coat the face which is exposed to the atmosphere or to causes of contamination with an enamel or smooth plastic covering which is noncorrosive under the intended conditions of exposure.

Figure 3:
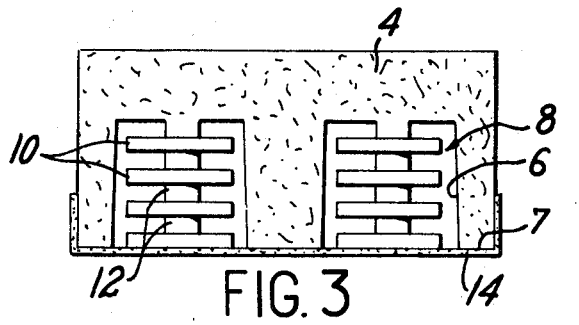
FIG. 3 is a cross-sectional view of a brick which is similar to that shown in FIGS. 1 and 2 and which is provided with an enamel coating.

The brick which is shown in FIG. 3 is identical with the brick of FIGS. 1 and 2 except for the fact that the front face 7 is coated with a thin layer 14 of smooth enamel affording resistance to any corrosive agents to which said front face may be exposed. This layer constitutes a bridge between the face 7 and the discs 10 which terminate in the same plane and therefore prevents any penetration of dust or liquid into the recesses 6. This enamel which must obviously be compatible with the aggregate and with the binder can be prepared by any suitable manner and fired at the same time as the brick. It is apparent that, among other potentialities, the presence of the enamel makes it possible:

to minimize the danger of permanent contamination resulting from radioactive fallout be preventing the admission of dust into the recesses and by providing a smooth surface which is practically not liable to retain dust particles;

to prevent the penetration of moisture into the pores of the brick, in particular if the enamel also covers the lateral faces of the brick over a sufficient distance from the front face: in practice a distance of 1 to 2 cm. is sufficient in the case of bricks having a depth comprised between 5 and 6 cm. and bonded by a cement mortar; it is preferably not to coat the lateral faces entirely in order that an effective bond may be formed between the bricks and the mortar;

to prevent the cement slurry which is projected from penetrating into the pores of the projecting portions which are intended to serve as sample cores.

The composition and thickness of the enamel can be chosen so that, in addition to its protective function, the enamel also performs the function of radiation filter. In particular, the enamel can improve the spectral response of the material by reducing the hypersensitivity of the aggregate to low-energy gamma rays.

By way of nonlimitative example, bricks formed of crystallized alumina powder agglomerated by means of a ceramic binder of the type hereinabove described have been coated with an enamel having the following composition by weight:

$SiO_2$ : 40 percent
$Al_2O_3$ : 3 percent
$PbO$ : 50 percent
$B_2O_3$ : 5 percent
$CaO$ : 1 percent
$Na_2O$ : 1 percent In the case of a layer having a normal thickness of the order of 0.5 mm., the enamel contains a charge of lead of 60 mg./cm.$^2$ which already overcomes to a certain extent the hypersensitivity of the alumina at low energy levels.

Figure 4:
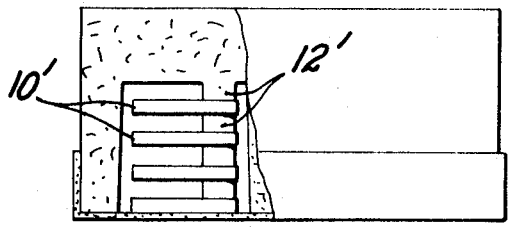
FIGS. 4, 5 and 6 illustrate three alternative forms of construction which are also designed to permit of easy extraction of sample cores as shown in cross section (FIGS. 4 and 5) and in perspective (FIG. 6).
Figure 5:
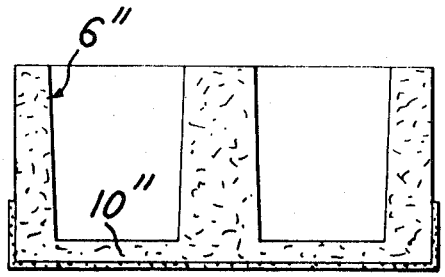

The brick can be fabricated in shapes which differ from that shown in FIGS. 1 to 3. Two alternative examples of fabrication are accordingly illustrated in FIGS. 4 and 5. The brick shown in FIG. 4 contains cylindrical sample cores, each core being precut into a number of discs 10' which are connected together by means of a lateral column 12'. The brick which is shown in FIG. 5 is provided with cylindrical blind-end bores 6'', the bottom portion of said brick being detachable by means of a simple tool so as to form a disc 10'' which is to be analyzed in a reading instrument.

There can also be formed in the brick either one or number of prefabricated cylindrical sample cores which are detachable by means of a simple thrust exerted by a lever which is inserted through the circular groove which surrounds the sample core; these cylindrical cores are then adapted to the type of reading instrument which is employed. In particular the cores can be either cut into discs or comminuted to powder.

Figure 6:
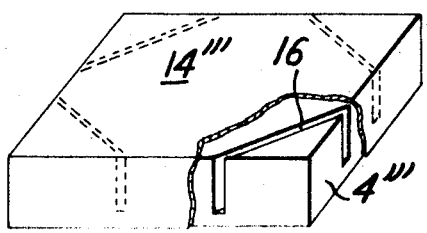

It is also possible to make use of solid parallelepipedal bricks; the samples which are taken from a brick for measurement of thermoluminescence are extracted in this case either directly in the form of powder by means of a brick drill or in the form of a cylindrical core by means of a circular tool. Diagonal cuts 16 can also be formed across the corners of a solid brick (as shown in FIG. 6) so as to permit the detachment of fragments which are intended to be utilized as samples.

It is understood that the term "brick" as used in this specification must be considered in a broad sense and includes not only the usual shapes which come within the primary meaning of the term but also extends to any other shapes which are commonly employed in the building industry such as tiles and slabs. When provided with an enamel coating, the last-mentioned type of material in accordance with the invention can be employed in decorative panels and floor surfacing elements, in which case the enamel could be colored; for example, it would be possible to add 0.2 percent $Cr_2O_3$ to the composition given above in order to obtain a yellow shade or traces of chromium, cobalt and zinc in order to obtain a green shade. In other applications, it will usually be found desirable to employ the material in the form of a part, at least one dimension of which will be a submultiple of the dimension of ordinary materials with which said part is associated. In the case of a roof, the tile which constitutes the dosimetry material will advantageously be placed at the edge of the roof in order that it may thus be limited to a small size.

What we claim is:

1. An ionizing radiation dosimeter comprising a radiothermoluminescent material consisting of alumina grains having a size smaller than 400 $\mu$, a proportion higher than 80 percent by weight of said alumina being in the form of $\alpha$ phase crystals, said alumina having a sodium content between 100 ≠ p.p.m. and 1 percent weight.

2. A dosimeter according to claim 1, wherein said alumina has a fluorine content between 100 p.p.m. and 1 percent by weight.

3. A dosimeter according to claim 1, wherein the proportion of grains having a size higher than 10 $\mu$ is at least equal to 60 percent.

4. A dosimeter according to claim 1, wherein the alumina grains are uniformly distributed within a part whose cohesion is ensured by means of a chemical, organic, ceramic or water-setting binder.

5. A dosimeter according to claim 4, wherein the nature and proportion of the binder are such that the part is endowed with resistance to natural weathering agencies and mechanical cohesion which are comparable with those of conventional construction materials and can be associated with said materials in the wall of a building.

6. A dosimeter according to claim 5, wherein the part has an alumina content between 70 percent and 98 percent by weight.

7. An ionizing radiation dosimeter consisting of a coherent part essentially comprising alumina grains having a size smaller than 400 $\mu$, a proportion higher than 80 percent by weight of said alumina being in the form of $\alpha$ phase crystals, and a binder, wherein the binder is ceramic material and is formed by firing feldspar and kaolin.

8. A dosimeter according to claim 7, wherein at least one face of the part which is exposed to natural weathering agencies is provided with an enamel coating or smooth plastics material covering which is compatible with the alumina and the binder.

9. A dosimeter according to claim 8, wherein the part is a brick and recesses are formed in that face of said brick which is exposed to natural weathering agencies and contain precut sampling cores and wherein said enamel or plastics material covering forms a bridge between the exposed face and the cores which form said recesses.

10. A dosimeter according to claim 8 wherein the enamel contains a proportion of lead which is such that it partly compensates the hypersensitivity of the alumina to low-energy radiations.